United States Patent
Barrois et al.

(10) Patent No.: US 10,417,585 B2
(45) Date of Patent: Sep. 17, 2019

(54) METHOD AND SYSTEM FOR REBALANCING A FACILITY FOR SHARED USE OF VEHICLES, AND FACILITY IMPLEMENTING SUCH A METHOD AND/OR SYSTEM

(71) Applicant: BLUECARSHARING, Vaucresson (FR)

(72) Inventors: Raphaël Barrois, Paris (FR); Olivier Bouvet, Paris (FR); Thomas Chaumeny, Paris (FR); Xavier Dutreilh, Paris (FR); Sylvain Geron, Paris (FR); Clément Lambrinos, Montreuil (FR)

(73) Assignee: BLUECARSHARING, Vaucresson (FR)

(*) Notice: Subject to any disclaimer, the term of this patent is extended or adjusted under 35 U.S.C. 154(b) by 672 days.

(21) Appl. No.: 15/114,055

(22) PCT Filed: Jan. 22, 2015

(86) PCT No.: PCT/EP2015/051180
§ 371 (c)(1),
(2) Date: Jul. 25, 2016

(87) PCT Pub. No.: WO2015/113882
PCT Pub. Date: Aug. 6, 2015

(65) Prior Publication Data
US 2016/0343068 A1    Nov. 24, 2016

(30) Foreign Application Priority Data

Jan. 31, 2014 (FR) .................................. 14 50803

(51) Int. Cl.
*G06Q 10/04* (2012.01)
*G06Q 10/06* (2012.01)
(Continued)

(52) U.S. Cl.
CPC ..... *G06Q 10/047* (2013.01); *G06Q 10/06315* (2013.01); *G06Q 30/0645* (2013.01); *G06Q 50/28* (2013.01); *G07C 1/00* (2013.01)

(58) Field of Classification Search
CPC ......... G06Q 30/0645; G06Q 10/06315; G06Q 50/28; G06Q 30/0639; G06Q 10/06312;
(Continued)

(56) References Cited

U.S. PATENT DOCUMENTS 6,701,300 B1 *  3/2004  Murakami ....... G06Q 10/06315
                                                     705/7.25
7,091,882 B2 *  8/2006  Doyle .................... G06Q 10/02
                                                      340/4.62
(Continued)

FOREIGN PATENT DOCUMENTS

EP     1172768 A2 *  1/2002  ............. B60R 25/23
EP     2226749 A1 *  9/2010  ............. G06Q 10/06
(Continued)

OTHER PUBLICATIONS

"Bike Share: A Synthesis of the Literature," Elliot Fishman, et al., Transport Reviews, 2013.*
(Continued)

*Primary Examiner* — Tyler W Knox
(74) *Attorney, Agent, or Firm* — Greer, Burns & Crain, Ltd.

(57) ABSTRACT

A method is provided for rebalancing vehicle collection/return stations, the method including the following steps:
for each station, determining:
a number of vehicles available at the station;
an average waiting time at the station, and
filtering the stations as a function of the parameters, the filtering providing:
a first list, the departure station list, and
a second list, the arrival station list,
(Continued)

designing at least one vehicle movement operation as a function of the lists, and carrying out at least one vehicle movement operation.

19 Claims, 6 Drawing Sheets

(51) Int. Cl.
*G06Q 50/28* (2012.01)
*G06Q 30/06* (2012.01)
*G07C 1/00* (2006.01)

(58) Field of Classification Search
CPC ......... G06Q 10/06313; G06Q 10/0631; G06Q 50/30; G07C 1/00; G07C 5/00
See application file for complete search history.

(56) References Cited

U.S. PATENT DOCUMENTS

| | | | | |
|---|---|---|---|---|
| 2002/0052772 | A1* | 5/2002 | Nishimoto | G06Q 10/06312 705/7.22 |
| 2002/0082893 | A1* | 6/2002 | Barts | G06Q 10/063 705/334 |
| 2002/0186144 | A1* | 12/2002 | Meunier | G07B 15/00 340/4.6 |
| 2003/0001779 | A1* | 1/2003 | Mintz | G01S 5/0027 342/463 |
| 2004/0010338 | A1* | 1/2004 | Ogura | G06Q 10/02 700/214 |
| 2004/0088392 | A1* | 5/2004 | Barrett | G01C 21/26 709/223 |
| 2004/0089503 | A1* | 5/2004 | Brand | B66B 1/2458 187/383 |
| 2006/0229928 | A1* | 10/2006 | Nix, Jr. | G06Q 10/063 705/7.31 |
| 2007/0027825 | A1* | 2/2007 | Pearce | G06Q 10/02 705/417 |
| 2008/0014908 | A1* | 1/2008 | Vasant | G08G 1/005 455/414.1 |
| 2010/0274656 | A1* | 10/2010 | Genschel | G06Q 30/00 705/14.27 |
| 2010/0280700 | A1* | 11/2010 | Morgal | G06Q 10/02 701/31.4 |
| 2012/0116825 | A1* | 5/2012 | Gallais | G06Q 10/02 705/5 |
| 2013/0006464 | A1* | 1/2013 | Speiser | G08G 1/01 701/25 |
| 2013/0073349 | A1* | 3/2013 | Kolling | G07B 15/02 705/13 |
| 2013/0261907 | A1* | 10/2013 | McQuade | F02D 41/2425 701/51 |
| 2014/0136414 | A1* | 5/2014 | Abhyanker | G06Q 50/28 705/44 |
| 2014/0227979 | A1* | 8/2014 | Maihoefer | H04L 63/18 455/41.2 |
| 2015/0095789 | A1* | 4/2015 | Hyde | G05B 19/042 715/738 |
| 2015/0142518 | A1* | 5/2015 | Farinha Gomes Felix | G06Q 30/0202 705/7.31 |
| 2015/0185034 | A1* | 7/2015 | Abhyanker | G01C 21/36 701/23 |
| 2015/0348179 | A1* | 12/2015 | Kamisawa | G08G 1/205 705/5 |
| 2016/0343068 | A1* | 11/2016 | Barrois | G06Q 10/06315 |

FOREIGN PATENT DOCUMENTS

| | | | | |
|---|---|---|---|---|
| WO | WO-0215149 A1 * | 2/2002 | | G08G 1/123 |
| WO | WO-02082337 A1 * | 10/2002 | | G06Q 10/06 |

OTHER PUBLICATIONS

"Electronnobility and Carsharing/Carpooling Services at the University of Deusto: A Preliminary Exploratory Survey," Konstantinos N. Genikomsakis, et al., IEEE, presented at Conference on Intelligent Transportation Systems, Oct. 6-9, 2013.*
"Carsharing Systems Demand Estimation and Defined Operations: A Literature Review," Diana Jorge, et al., European Journal of Transport and Infrastructure Research, 2013.*
"Rebalancing the Rebalancers: Optimally Routing Vehicles and Drivers in Mobility-on-Demand Systems," Stephen L. Smith, et al., presented at the American Control Conference (ACC), Jun. 17-19, 2013.*
"Logistical Inventory Approach in Forecasting and Relocating Share-Use Vehicles," Hao Wang, et al., IEEE, published 2010.*
"Relocation Strategies and Algorithms for Free-Floating Car Sharing Systems," by Simone Weikl, et al., Munich University of the Federal Armed Forces, Department of Traffic Engineering, IEEE report, published Oct. 25, 2013.*
"New Business Models for Electric Cars," Mats Williander, et al., presented at EVS27 International Battery, Hybrid and Fuel Cell Electric Vehicle Symposium, Nov. 17-20, 2013.*
"Relocation Simulation Model for Multiple-Station Shared-Use Vehicle Systems," Alvina G. H. Kek, et al., Transportation Research Record: Journal of the Transportation Research Board, No. 1986, 2006.*
Wang et al., "Dynamic Relocating Vehicle Resources Using a Microscopic Traffic Simulation Model for Carsharing Services," Third International Joint Conference on Computational Science and Optimization (2010), IEEE, pp. 108-111.
Weikl et al., "Relocation Strategies and Algorithms for free-floating Car Sharing Systems," 15th International IEEE Conference on Intelligent Transportation Systems (2012), pp. 355-360.
French Search Report from French Patent Application No. 1450803, dated Aug. 13, 2014.
International Search Report from International Patent Application No. PCT/EP2015/051180, dated Jun. 2, 2015.

* cited by examiner

METHOD AND SYSTEM FOR REBALANCING A FACILITY FOR SHARED USE OF VEHICLES, AND FACILITY IMPLEMENTING SUCH A METHOD AND/OR SYSTEM

BACKGROUND

The present invention relates to a method for rebalancing a facility for the shared use of vehicles comprising a plurality of stations that are geographically remote from each other. It also relates to a system implementing such a method and a facility implementing such a method and/or such a system.

The field of the invention is the field of the shared use of a fleet of vehicles, in particular a fleet of electric vehicles, over a plurality of stations making it possible for users to collect or return such vehicles, for example in the context of automated vehicle rental.

Automated vehicle rental is a fast-growing field. Conurbations wishing to reduce the number of vehicles present in their area are setting up automated vehicle rental facilities.

Automated rental facilities, and more generally facilities for the shared use of a fleet of vehicles, comprise several stations, each enabling users to start to use a vehicle, that is, to take possession of a vehicle, and to return a vehicle after use.

These facilities require station rebalancing operations. It is very rare for a user taking possession of a vehicle at a given station to return that vehicle to the same station after use of the vehicle. In addition, flows of users occur naturally, for example from a residential area to a business area in the morning and vice versa in the evening. As a result, it is common to have "empty" stations where no vehicles are available, while other stations are overloaded with vehicles, with the distribution of the vehicles at the stations not meeting users' requirements as a result.

Such a situation brings several drawbacks, including a very long waiting time for users visiting "empty" stations or those wishing to return a vehicle to an overloaded station, and impaired access to the shared vehicle use service.

In an attempt to remedy these drawbacks, operators have been deployed to rebalance the stations. These operators move vehicles from the overloaded stations to the empty stations.

However, such rebalancing is not effective in reducing the waiting time and increasing access to the vehicle use service. In addition, although such rebalancing is relatively inefficient, it is very costly in terms of labour and very time-consuming.

An object of the present invention is to remedy the aforementioned drawbacks.

Another object of the invention is to propose a method and a system for rebalancing vehicles in a facility for the shared use of vehicles that are more efficient than the existing methods and systems in terms of reducing the waiting time and improving access to the service.

Another object of the invention is to propose a method and a system for rebalancing vehicles in a facility for the shared use of vehicles that are less costly than the existing methods and systems.

Finally, another object of the invention is to propose a method and a system for rebalancing vehicles in a facility for the shared use of vehicles that are more flexible and more responsive to changes occurring in the facility.

SUMMARY

The invention proposes to achieve at least one of the aforementioned objects by means of a method for rebalancing collection/return stations for vehicles made available for shared use, said method comprising the following steps:
  for each station, detecting each vehicle departure from and arrival at said station and storing the data relating to said station in association with an item of time data,
  for each station, determining:
    a number of vehicles available at said station,
    a waiting time of each vehicle at said station,
  determining and storing an average waiting time for each station as a function of the data stored in association with a given time slot, and
  filtering the stations as a function of the number of vehicles available and the average waiting time, said filtering providing:
    a first list, said departure station list, and
    a second list, said arrival station list;
  designing at least one vehicle movement operation between a station on the first list and a station on the second list, and
  carrying out at least one vehicle movement operation.

The invention therefore makes it possible to carry out rebalancing taking into account not only the number of vehicles at a station, but also other criteria representative of both the actual activity at each station in the facility and the desired activity at each station in the facility. Thus, the rebalancing carried out according to the invention is more flexible in order to adapt to the actual activity in the facility at each station. In addition, as the actual activity can change over time, the rebalancing according to the invention takes these changes into account individually at the level of each station, and is therefore more responsive.

Furthermore, by taking into account the criteria representative of the actual activity at each station and the desired activity at each station, the method according to the invention makes it possible for example to not supply a station at which there is not much activity, even if the number of vehicles at that station is low. Similarly, the method according to the invention makes it possible for example not to relieve a station at which there is a lot of demand, even if there are many vehicles at that station compared with a standard situation. The method according to the invention therefore makes it possible to avoid unnecessary vehicle movements, which on the one hand reduces the rebalancing costs and on the other hand makes it possible to have more operators available for other stations at which rebalancing can be carried out more quickly and responsively, thus reducing the average waiting time.

The waiting time can in particular correspond to a period between a return of a vehicle to said station and a collection of a vehicle from said station subsequent to said return.

Thus, for a station, when the average waiting time is long this means that, for that station, the average demand, which corresponds to the inverse of the waiting time, is low. Conversely, when the average waiting time is short, this means that the average demand is high. It is possible to take into account the variation in waiting time, and therefore in demand, as a function of the different time slots in a day or week. For example, for a station, demand can be high at work arrival and departure times and very low during the day. The method according to the invention advantageously makes it possible to take these variations into account.

The periods between a vehicle collection operation and a vehicle return operation can be determined by detecting, for each vehicle:
  the vehicle return time, and optionally day and month;
  the vehicle collection time, and optionally day and month.

These data can be detected for example by a presence sensor arranged in a parking space and/or, for electric vehicles, by a sensor arranged in the charging cable of the electric vehicle. The data detected can be sent to a remote server connected to each station and comprising calculation means for determining the average waiting period.

Each waiting time stored can thus be associated with at least one criterion such as the type of day, with only the waiting times associated with this criterion being used to calculate the average waiting time.

According to an advantageous embodiment, the time slot can be a rolling time slot with a predetermined range, and calculated as a function of the current time. More specifically, the time slot can be defined by adding a predetermined number of one or more hour(s) to the Lime. It is thus possible to take into account future variations in terms of waiting time or demand and to anticipate the rebalancing necessary to meet future demand.

At least one of the filtering or design steps is carried out by taking into account, for each station, at least one item of data relating to at least one neighbouring station of said station, the data or one of the items of data being a number of vehicles in a set, known as a zone, comprising said station and the stations closest to it.

The process thus takes the stations into account not in an isolated manner but also in terms of the impact of the status of each station on the neighbouring stations, for more accurate balancing.

According to the invention, a zone associated with a station can be defined as comprising:
all of the stations located at a distance and/or a predetermined journey time as a function of the station in relation to which it is determined: in this case, the number of stations in the zones is variable and two defined zones associated with two stations can comprise a different number of stations; or
a predetermined number of the stations closest to the station in relation to which it is determined: in this case, two defined zones associated with two stations comprise the same number of stations.

The filtering can in particular comprise the following steps carried out for at least one, preferably each, station:
comparing the total number of vehicles at the station or in the zone associated with said station to a first threshold;
when said total number is above said first threshold, adding said station to a list, said list of stations to be relieved;
comparing said total number to a second threshold, lower than said first threshold;
when said total number is below said second threshold, adding said station to a list, said list of stations to be supplied.
Such filtering makes it possible to determine the stations for which a rebalancing operation can be envisaged, by eliminating the stations that have a sufficient supply of vehicles as a function of the number of vehicles at the station or in the zone. In addition, this operation makes it possible to carry out an efficient first selection simply, using simple calculations that are not too difficult to implement.

The method according to the invention can advantageously comprise the determination, for at least one station, in particular each station on the list of stations to be relieved, of a parameter, said occupancy rate, as a function of:
the number of vehicles available at the station, and
the average waiting time for a given time slot at said station;
the filtering step being carried out taking into account the value of said occupancy rate.

Thus, the method according to the invention makes it possible to apply an order to the stations to be relieved as a function of the number of vehicles at the station and the average waiting time. Thus, it is possible to prioritize the relief of the stations that have the most vehicles available relative to the average waiting time, i.e. the stations with the highest occupancy relative to the demand at those stations.

According to a particular embodiment that is in no way limitative, the occupancy rate, referred to as $OR_i$, for station i, can be determined according to the following equation:

$$OR_i = AWT_i = NVS_i$$

where:
$AWT_i$ is the average waiting time at station i, and
$NVS_i$ is the number of vehicles available at station i.

Furthermore, the filtering step can comprise a step of selecting departure stations, in particular from the list of stations to be relieved as a function of the occupancy rate, said selection step comprising the following steps:
determining a number of available operators for moving a vehicle;
for each available operator, by successive iterations:
determining the station, in particular on the list of stations to be relieved, with the highest associated occupancy rate;
adding said station to the list of departure stations;
updating the occupancy rate associated with said selected station by subtracting one vehicle from the number of vehicles available at said station.

Thus, when there are fewer available operators than stations to be relieved, the method according to the invention makes it possible to prioritize the relief of the stations with the highest occupancy. The station or stations selected in this way are placed on the list, or cluster, called "departure stations".

Furthermore, when a station is selected as a departure station and added to the list of departure stations, the occupancy rate associated with this station is updated (as if an operator had relieved this station of a vehicle) before another iteration of the selection steps is carried out. Thus, when a station has a very high occupancy rate, it is possible for it to be selected as a departure station again for another rebalancing operation.

The method according to the invention can also comprise the determination of a parameter, known as a flow, as a function of said average waiting time and an average time said return time, the filtering step comprising the selection of at least one departure station as a function of said flow, said selection comprising at least one iteration of the following steps:
comparing the flow associated with a station to a first threshold;
when said flow is below said first threshold, adding said ion to the list of departure stations.

The average return time is in particular the average time between the collection of a vehicle and the subsequent return of a vehicle to the station.

The flow corresponds in particular to the inverse of the waiting time minus the inverse of the average return time, the first threshold generally being very negative, which means that returns to the station are very high relative to vehicle collections.

If applicable, the selection step using the flow is carried out before the step of determining the number of available operators in order to determine the number of items on the departure list, the number of operators taking into account the number of stations at which the flow is below said threshold. It corresponds to the actual number of available operators minus the number of stations that met the previous flow criterion.

The flow can also and/or alternatively be compared to a value range, in particular a range of values around 0 for the flow as defined above, and when the flow is within the value range, the station can be excluded from the list of stations to be relieved, as it is then considered to be self-regulating.

Such filtering using the flow parameter makes it possible to determine the stations for which a rebalancing operation can be envisaged, taking into account the situations that are not necessarily covered by the aforementioned operations as a function of the average waiting time and an average vehicle return time at the station.

Each of the thresholds used during the filtering step can be determined by statistical analysis of the elapsed time slots, and can be updated as a function of observations on the ground.

According to a particular embodiment that is in no way limitative, the flow, referred to as $F_i$, for station i can be determined according to the following equation:

$$F_i = \frac{1}{AWT_i} - \frac{1}{ATTA_i}$$

where:
AWT$_i$ is the average waiting time at station i, and
ATTA$_i$ is the average time between two consecutive vehicle arrivals at station i.

Furthermore, the method according to the invention can advantageously comprise the determination, for at least one station, in particular each station on the list of stations to be supplied, of a parameter, said relief rate, as a function of:
the number of vehicles available at the station, and
the average waiting time for a given time slot at said station; the filtering step being carried out taking into account the value of said relief rate.

Thus, the method according to the invention makes it possible to apply an order to the stations to be supplied as a function of the number of vehicles at the station and the average waiting time. Thus, it is possible to prioritize the supplying of the stations that have the fewest vehicles available relative to the average waiting time, i.e. the stations with the lowest occupancy relative to the demand at those stations.

According to a particular embodiment that is in no way limitative, the relief rate, referred to as $RR_i$, for station i, can be determined according to the following equation:

$$RR_i = AWT_i \times (NVS_i + 1)$$

where:
AWT$_i$ is the average waiting time at station i, and
NVS$_i$ is the number of vehicles available at station i.

Furthermore, the filtering step can advantageously comprise a step of selecting arrival stations, in particular from the list of stations to be supplied as a function of the relief rate, said selection comprising the following steps:
determining a number of available operators for moving a vehicle;
for each available operator, by successive iterations:
determining the station, in particular on said list of stations to be supplied, with the lowest associated relief rate;
adding said Station to the list of arrival stations;
updating the relief rate associated with said selected station by adding one vehicle to the number of vehicles available at said station.

Thus, when there are fewer available operators than stations to be supplied, the method according to the invention makes it possible to prioritize the supplying of the stations with the lowest occupancy. The station or stations selected in this way are placed on a list, or cluster, called "arrival stations".

Furthermore, when a station is selected as an arrival station and added to the list of arrival stations, the relief rate associated with this station is updated (as if an operator had supplied this station with a vehicle) before another iteration of the selection steps is carried out. Thus, when a station has a very low occupancy rate, it is possible for it to be selected as an arrival station again for another rebalancing operation.

The method according to the invention, and in particular the design step, can also advantageously comprise a step of determining a balancing time, carried out before the movement step, comprising the following operations, carried out by successive iterations:
for each station on the list of departure stations, determining a parameter, said departure parameter, as a function at least of the occupancy rate;
for each station on the list of arrival stations, determining a parameter, said arrival parameter, as a function at least of the relief rate;
calculating the balancing time between each of the stations on the departure station list and each of the stations on the arrival station list, as a function of said departure and arrival parameters and a journey time between said departure and arrival stations; and
selecting the movements as a function of the balancing times respectively calculated.

It is thus possible to take into account, for each vehicle movement operation, both the possibility of a user going to a neighbouring station to the station in question and the time that the movement of the vehicle from the departure station to the arrival station would take.

The departure parameter can also be calculated as a function of a probability of transfer to at least one closer station, in particular to all of the stations in the zone associated with said station.

The arrival parameter can also be calculated as a function of a probability of transfer to at least one closer station, in particular to all of the stations in the zone associated with said station.

According to a particular embodiment that is in no way limitative, the departure parameter for station i, referred to as $DP_i$, can be determined according to the following equation:

$$DP_i = \frac{1}{(AWT_i \times NVS_i) + p \times (\sum V_k \times AWT_k \times NVZ_k)}$$

where:
p is the probability of return to at least one closest station,
k is the number of stations in the zone associated with station i,
NVZ$_k$ is the number of vehicles in the zone associated with station k, and
$V_k$=1 if station k is empty and $V_k$=0 if not.

According to a particular embodiment that is in no way limitative, the arrival parameter for station i, referred to as $AP_i$, can be determined according to the following equation:

$$AP_i = \frac{1}{(AWT_i \times (NVS_i + 1)) + p \times (\sum V_k \times AWT_k \times (NVZ_k + 1))}$$

where:

p is the probability of transfer to at least one closest station, k is the number of stations in the zone associated with station i, $NVZ_k$ is the number of vehicles in the zone associated with station k, and $V_k=1$ if station k is empty and $V_k=0$ if not.

According to a particular embodiment that is in no way limitative, the balancing time between a departure station i and an arrival station j, referred to as $BT_{i \to j}$, can be determined according to the following equation:

$$BT_{i \to j} = DP_i - (JT_{i \to j} \times AP_j)$$

where:

$DP_i$ is the departure parameter of departure station i, $AP_j$ is the arrival parameter of station j, and $JT_{i \to j}$ is the journey time from station i to station j.

Thus, when the balancing time is very low, this means that the journey time and/or the arrival parameter is high compared to the departure parameter. This therefore means that the vehicle will in theory be collected from the arrival station before it is collected from the departure station.

In the opposite situation, this means that the journey time and/or the arrival parameter is very low compared to the departure parameter. This means that it is highly probable that the vehicle will be collected from the departure station before it is collected from the arrival station.

The design step can also take into account the balancing time by at least one iteration of the following steps:

determining the maximum balancing time from the balancing times calculated, determining the departure and arrival stations with which said maximum balancing time is associated and selecting these associated stations, excluding said stations from the departure and arrival lists, updating the number of vehicles at the departure and arrival stations as if the movement had already taken place.

Thus, the method according to the invention makes it possible to prioritize the balancing operations with the shortest balancing time.

Advantageously, the design step can comprise a step of selecting an operator to carry out a vehicle movement, said selection comprising the following steps:

determining the geographical position of each available operator;

as a function of said geographical position, determining the operator closest to the departure station involved in said movement;

sending a message to said closest operator to inform him of the task to be carried out;

updating the status of the operator to unavailable.

Thus, the method according to the invention makes it possible to select the operator closest to the departure station involved in the vehicle movement operation. The method according to the invention therefore makes it possible to minimize the travel time of an available operator to the departure station.

According to another aspect of the invention, a rebalancing system for collection/return stations of vehicles made available for shared use is proposed, said system comprising:

means for detecting each vehicle departure from and arrival at the station, for example presence sensors in each of the parking spaces at the station, such as cameras or sensors inserted in the charging cable of the vehicle in the case of electric vehicles;

means for determining, for each station, the following parameters:

a number of vehicles available, a waiting time of the vehicle at the station, such as sensors detecting the arrival time or date of each vehicle and the departure time or date of a vehicle;

means for storing data relating to the waiting times in association with an item of time data;

means for determining an average waiting time for each station as a function of the data stored in association with a given time slot, comprising for example calculation means receiving the data from each station and configured to calculate the average waiting time;

means for storing the average waiting time determined;

means for filtering the stations to be balanced as a function of said parameters, said filtering providing:

a first list, said departure station list, and a second list, said arrival station list; and means for designing at least one vehicle movement operation between a station on the first list and a station on the second list.

The filtering means and/or the designing means can comprise:

one or more calculation means configured/programmed to calculate desired data, such as those described above, using previously entered equations, such as those set out above;

means, such as geolocation means, carried by the operators on the ground to determine and provide information relating to the position of each operator.

Advantageously, some or all of the calculation means can be centralized at a central site connected to each station and each operator.

According to another aspect of the invention, a facility for the shared use of vehicles is proposed, in particular an automated vehicle rental facility, said facility comprising:

a plurality of vehicle collection/return stations; and means for implementing the steps of the rebalancing method according to the invention, or a rebalancing system according to the invention.

BRIEF DESCRIPTION OF THE DRAWINGS

Other advantages and characteristics of the invention will become apparent on examination of the detailed description of embodiments which are in no way limitative, and the attached diagrams, in which.

DETAILED DESCRIPTION

Of course, the embodiments described below are in no way limitative. In particular, variants of the invention can be considered comprising only a selection of the characteristics described hereinafter, in isolation from the other characteristics described, if this selection of characteristics is sufficient to confer a technical advantage or to differentiate the invention with respect to the state of the art. This selection comprises at least one, preferably functional, characteristic without structural details, or with only a part of the structural details if this part alone is sufficient to confer a technical advantage or to differentiate the invention with respect to the state of the prior art.

In particular, all the variants and embodiments described can be combined together if there is no objection to this combination from a technical point of view.

In the figures and in the following description, elements common to several figures have the same reference.

The examples described below relate to the automated rental of electric cars at several rental sites.

Figure 1:
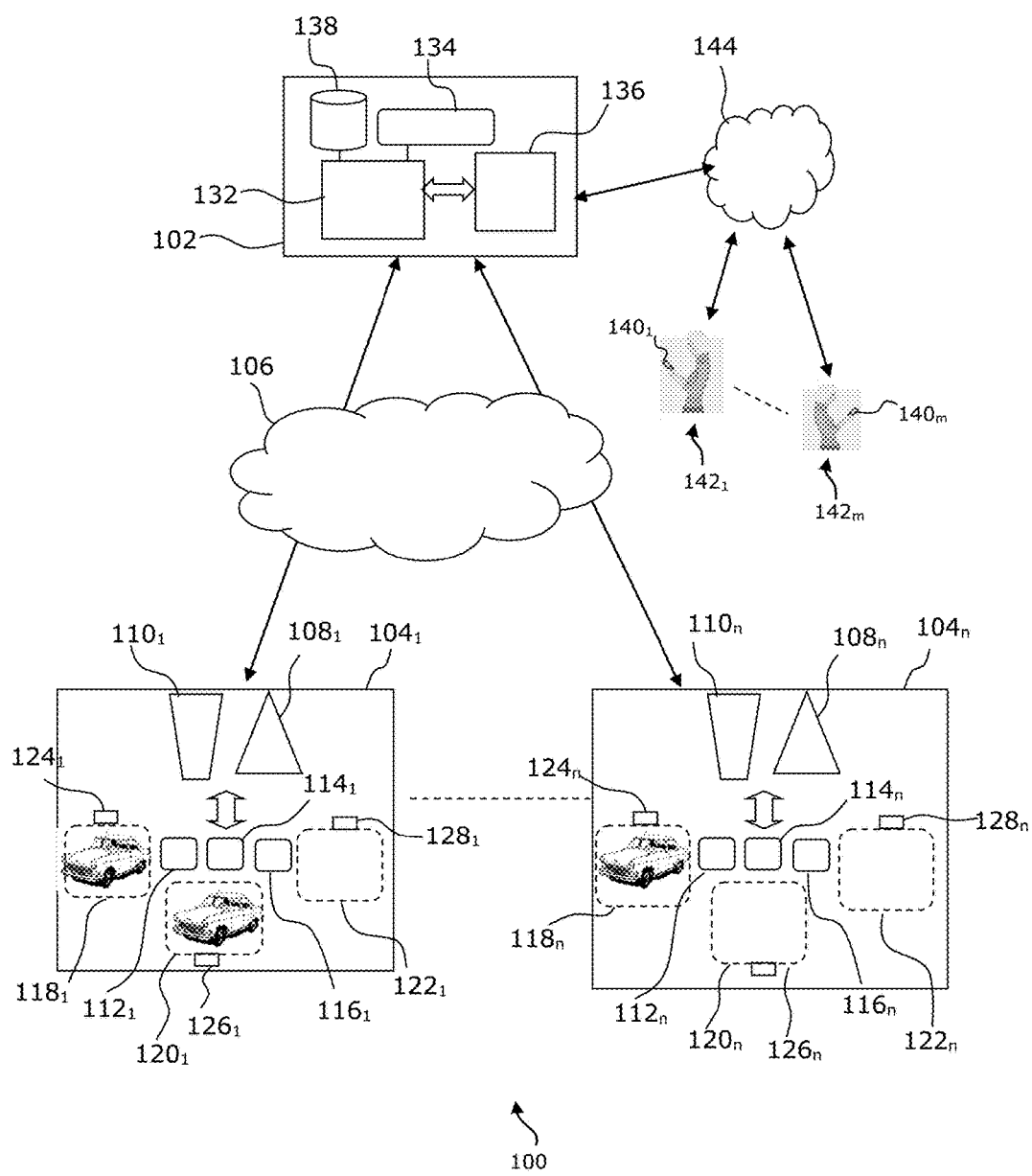
FIG. 1 is a diagrammatic representation of a vehicle rental facility implementing the method according to the invention.

FIG. 1 is a diagrammatic representation of a facility for the shared use of vehicles, such as for example in the context of automated electric vehicle rental, implementing the method according to the invention.

The facility 100 shown in FIG. 1 comprises a central site 102 and several stations 104$_1$-104$_n$ enabling users to collect or return vehicles. The central site 102 is connected to each of the stations by means of a wireless communications network 106, for example GPRS, or a wired network, for example of the DSL or LAN type. Preferably, each station 104 is connected to the central site by mean of the two separate networks, which enables continuous connection even if one of the networks fails.

Each station 104 comprises a management terminal 110 for managing the station, such as for example a vehicle rental terminal, and several charging terminals 112-116, each charging terminal being provided for charging a vehicle equipped with an electric battery in a parking space, namely the parking spaces 118-122.

Some stations 104 also comprise a subscription terminal 108 for registering new subscribers.

Each parking space 118-122 at a station 104 comprises a presence detector module 124-128, namely weighing means, a camera and/or a vehicle electrical connection detector, connected to the management terminal 110 of the station 104, to detect the presence or absence of a vehicle in a parking space 118-122, and therefore the departure of a vehicle from the station 104 and the arrival of a vehicle at the station 104. The management terminal 110 is programmed to record the times and dates of vehicle arrivals at and departures from the station 104.

The central site 102 can be connected directly to each of the management terminals 110 at a rental site 104 by means of the network 106 and/or to the charging terminals 112-116.

The central site 102 comprises a central management server 132, a calculation and analysis module 134, known as central, a communications module 136, known as central, and a database 138 in which the number of vehicles available at that station and the arrival and departure times (dates) of the vehicles at that station are stored in association with each station 104 identifier.

The facility 100 also comprises geolocation and communications modules 140$_1$-140$_m$, for example smartphones or GPS beacons, carried by operators 142$_1$-142$_m$ located in the zone covered by the facility 100 by means of a wireless communications network 144.

The calculation and analysis module 134 is configured to calculate, for each station and as a function of the data sent by the station and predefined equations, the following data:
the number of vehicles available at the station,
the average waiting time of the vehicle at the station, which corresponds to the period between a return of the vehicle and a subsequent collection, and the average return time, which corresponds to the period between a vehicle collection and a subsequent return, for a given time slot,
the number of vehicles in a set, known as a zone, comprising the stations closest to said station, and
the flow, as a function of the average waiting time and the average return time;
and to store these data in the database 138 in association with the station identifier.

The calculation and analysis module 134 is also configured to place one or more stations 104 on the list of stations to be supplied or the list of stations to be relieved, again as a function of the data sent by the stations.

The calculation and analysis module 134 is also configured to calculate an occupancy rate for each station 104 placed on the list of stations to be supplied, and a relief rate for each station on the list of stations to be relieved, again as a function of the data sent by the stations.

The calculation and analysis module 134 is also configured to:
select stations placed on the list of stations to be relieved as departure stations,
select stations placed on the list of stations to be supplied as arrival stations,
calculate the balancing times between each departure station and each arrival station,
determine the closest operators for each departure station, and
select the vehicle movement operations by allocating a vehicle movement to each available operator as a function of the operator's position and the balancing time.

The facility 100 makes it possible to manage a plurality of electric vehicles made available for shared use, for example in the context of rental. Users are capable of interacting with the various terminals and with the various elements of the vehicles and the operators are intended to intervene on the vehicles with a view to carrying out rebalancing tasks.

Alternatively, the calculation and analysis module 134 can be replaced by a plurality of calculation and analysis modules each dedicated to calculating a parameter or carrying out a calculation or analysis operation from those described above.

FIGS. 2-7 are a diagrammatic representation in the form of a diagram of the various steps of a method for rebalancing the vehicle collection/return stations of a facility for the shared use of vehicles according to the invention.

Figure 2:
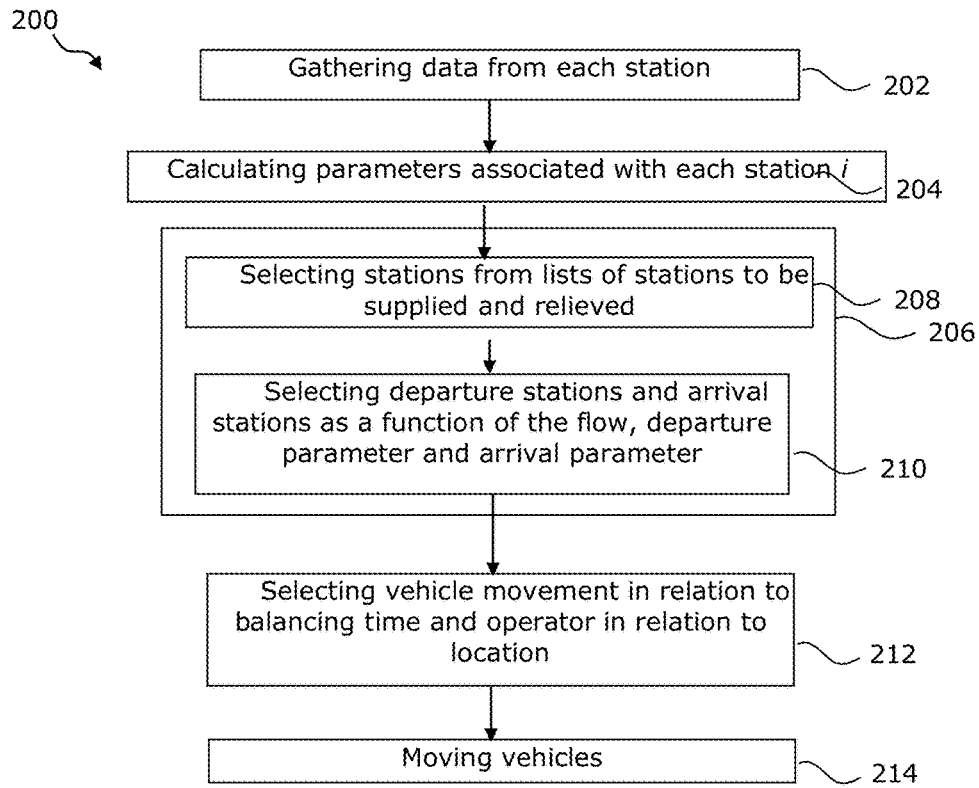
FIGS. 2-7 are diagrammatic representations in the form of diagrams of an embodiment of the method according to the invention.

FIG. 2 is a general view of an example of the method according to the invention and FIGS. 3-6 are detailed views of various steps of the method shown in FIG. 2.

The method 200 shown in FIG. 2 comprises a step 202 of gathering data from each of the stations in the facility. This data gathering step takes place in real time and the data are gathered continuously.

Step 202 is followed by a step 204 of determining various parameters for each of the stations. During this step 204, the parameters determined for each station comprise:
the average waiting time,
optionally, the average return time,
the number of vehicles at the station in question, the zone associated with the station and the total number of vehicles in the zone, and the flow associated with the station.

The value of each of these parameters is stored in association with the station identifier.

This step 204 is followed by a filtering step 206, which supplies several lists: on the one hand, a list of stations to be relieved and a list of departure stations prepared from the list of stations to be relieved, and on the other hand, a list of stations to be supplied and a list of arrival stations prepared from the list of stations to be supplied.

This filtering step comprises:

a first step 208 of selecting the stations to determine the stations that form part of the lists of stations to be relieved and stations to be supplied, a second step 210 of selecting the departure stations, in particular from the stations to be relieved, and the arrival stations, in particular from the stations to be supplied.

The filtering step 206 is followed by a step 212 of designing the vehicle movement operations, which comprises the selection of the vehicle movement operations to be carried out as a function of the balancing time and the operators to carry out these movements in relation to their geographical location.

In the present example, the method 200 ends with a step 214 of moving vehicles.

Steps 204 to 214 are carried out at a predetermined frequency or at the request of a supervisor.

Figure 3:
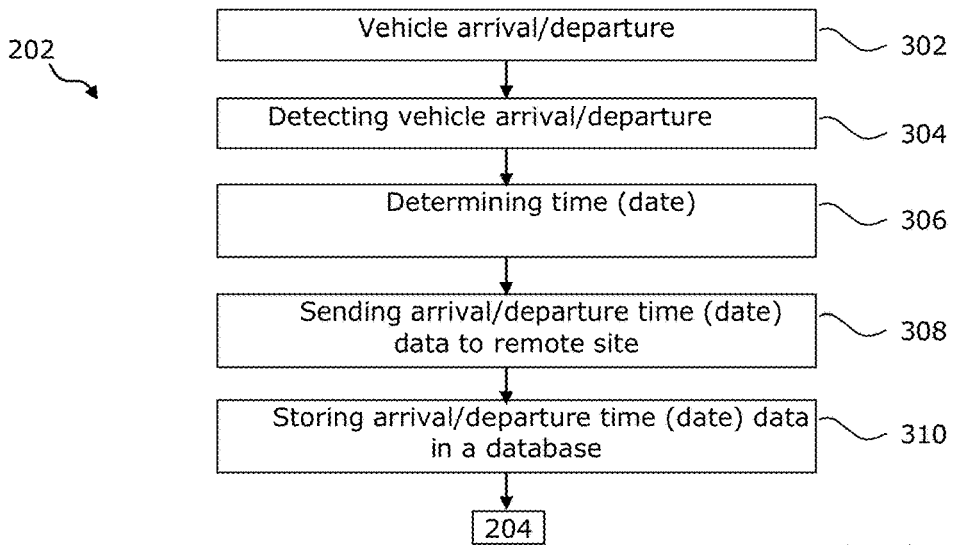

FIG. 3 is a diagrammatic representation in the form of a diagram of the data gathering step 202.

Step 202 starts with a step 302 of a vehicle arriving at or departing from the station.

The arrival or departure of a vehicle is detected during a step 304.

Step 306 determines the time and date of arrival or departure of a vehicle by consulting a clock.

The data relating to the time or date are sent to a remote site during a step 308, optionally in association with an item of data identifying the station and the vehicle in question.

The remote site stores these data in a database, in association with a station identifier, during a step 310.

This step 202 is carried out each time a vehicle arrives at or departs from each station in the facility.

Figure 4:
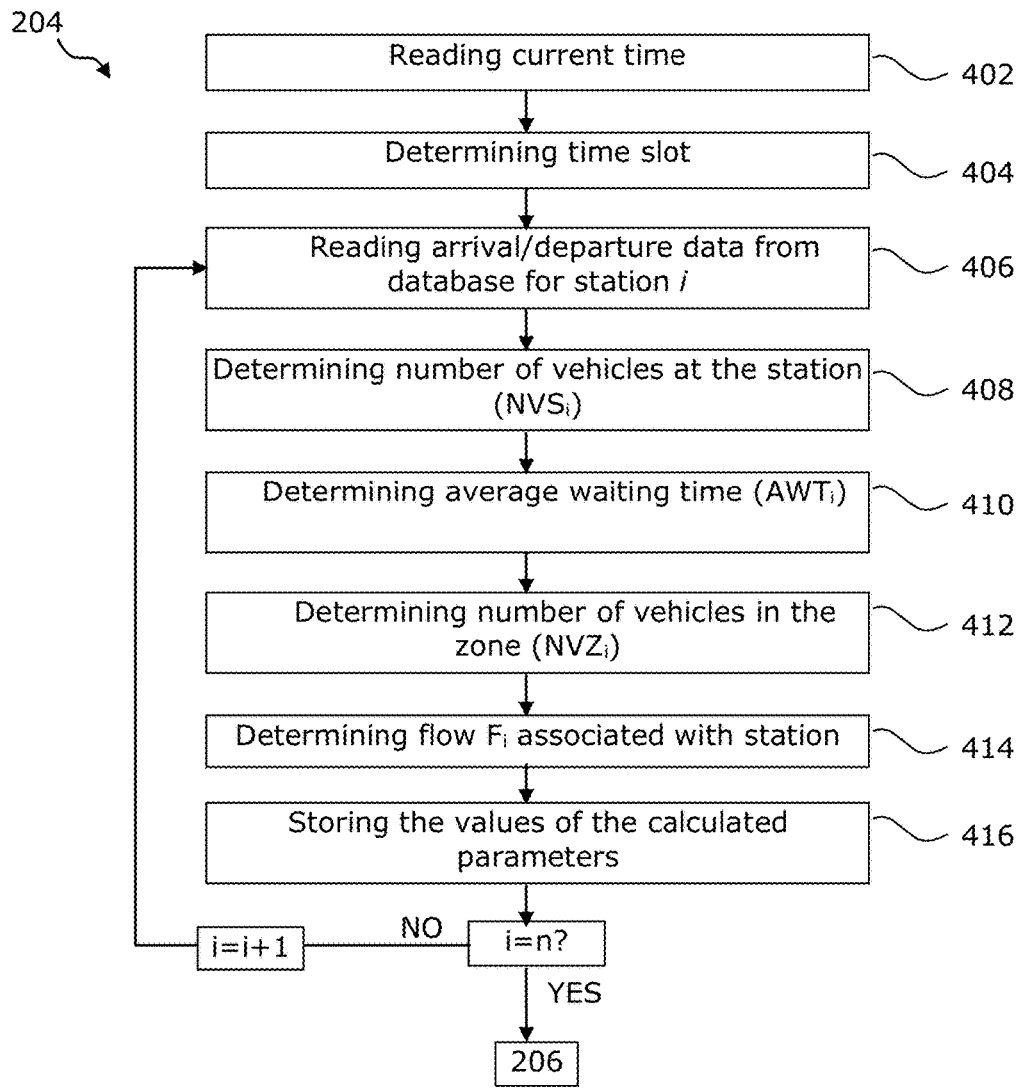

FIG. 4 is a diagrammatic representation in the form of a diagram of the step 204 of calculating parameters associated with each station.

Step 204 is carried out either at a predetermined frequency or at the request of an operator, in particular intended to supervise the fleet as a whole.

Step 204 comprises a step 402 of reading the current time on a clock.

As a function of the current time, a step 404 determines a comparative time slot as a function of a predefined rule, such as for example:

Time slot=Current time+5 hours.

During a step 406, all of the data relating to the departures and arrivals at each station from a given date, for example the 30 days preceding the day on which the procedure is implemented, previously stored for this time slot, are loaded from a database. These data form a statistical sample on the basis of which it is possible to model the behaviour of the station.

Furthermore, in an embodiment of the method, it is possible for each waiting time to also be associated with one or more criteria such as the type of day (for example, weekday, weekend or school term or school holidays), the data chosen for the average waiting time being those associated with the same criteria as at the time when the method is implemented.

As a function of the data loaded, a step 408 determines the number of vehicles at station i at the current time, referred to as $NVS_i$, also as a function of the vehicle departure and arrival times stored for the station.

A step 410 determines the average waiting time, referred to as $AWT_i$, for station i, calculated by finding the average of the periods between consecutive collection and return of vehicles in the time slot. This waiting time can be determined in a different manner from the one described, in particular only when there is one vehicle left at the station, or as the time between two rentals.

Steps 408 and 410 can be carried out one after the other or at the same time.

Then, a step 412 determines the total number of vehicles, referred to as NVZ, in a zone previously associated with the station by adding up the vehicles located at all of the stations in the zone. To this end, step 412 determines the zone i associated with station i, that is, all of the stations forming zone i, namely in the example station i and the four stations closest to station i, loads the data relating to each of these stations, determines the number of vehicles at each of these stations and adds up the numbers of vehicles located at each of the stations forming zone i.

Then, a step 414 determines the flow, referred to as $F_i$, associated with station i, according to the following equation:

$$F_i = \frac{1}{AWT_i} - \frac{1}{ATTA_i}$$

where $ATTA_i$ is the average return time between a collection and a subsequent return to station i.

The values obtained for the various parameters, namely the parameters $NVS_i$, $AWT_i$, $NVZ_i$ and $F_i$, are stored in a database in association with a station identifier during a step 416.

Steps 406 to 412 are carried out for each of the n stations in the facility.

Figure 5:
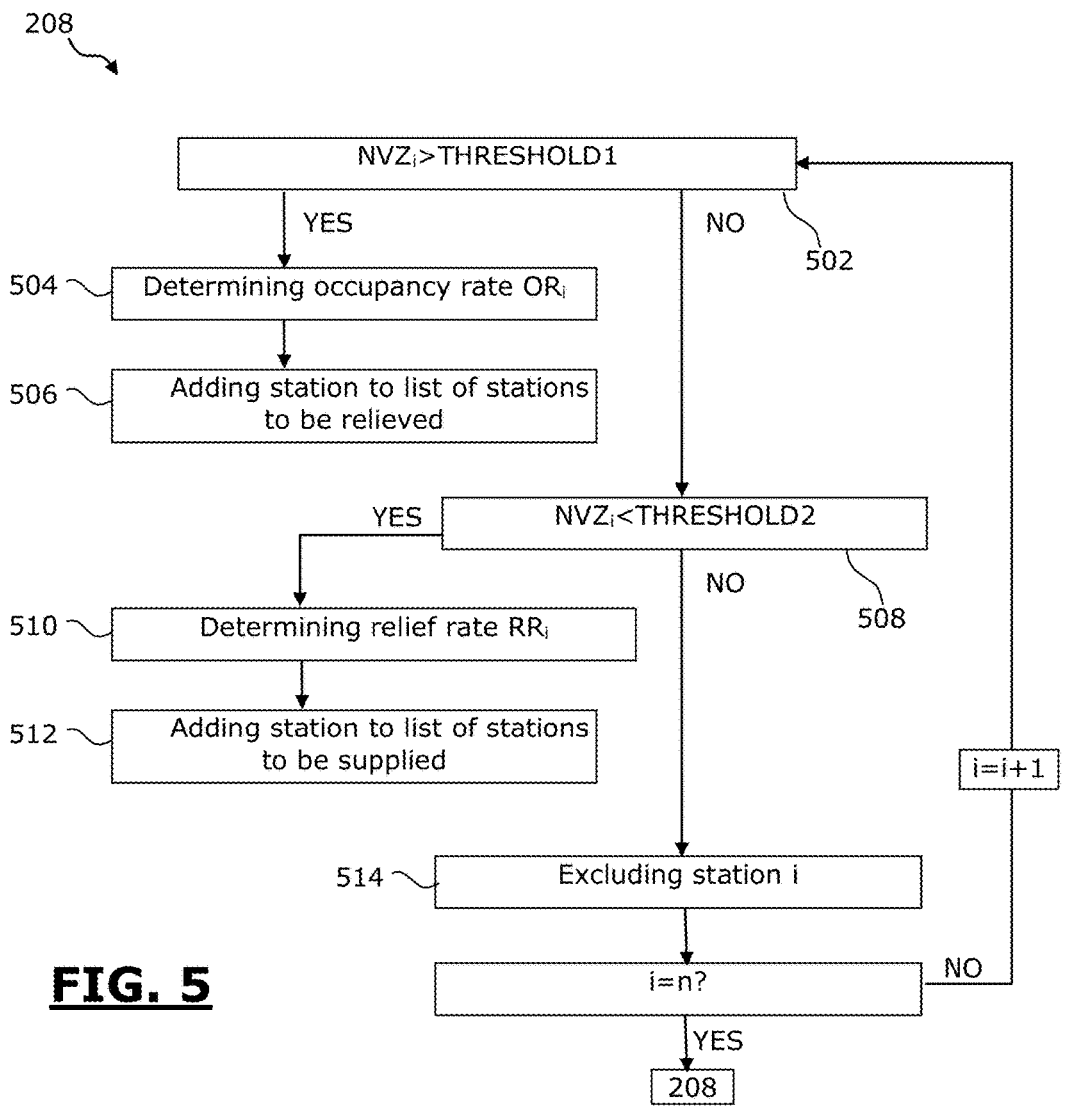

FIG. 5 is a diagrammatic representation in the form of a diagram of the step 208 of selecting the stations from the lists to be supplied and relieved.

Selection step 208 is carried out for each of the n stations in the facility.

It comprises a step 502 of comparing the total number of vehicles $NVZ_i$ in zone i associated with station i to a first threshold THRESHOLD1.

If $NVZ_i$>THRESHOLD1, a step 504 determines the occupancy rate $OR_i$ associated with this station according to the following equation:

$$OR_i = AWT_i \times NVS_i$$

Station i is added to a list of stations to be relieved during a step 506, as this means that there are too many vehicles in the zone.

If during step 502, $NVZ_i$<THRESHOLD1, then a step 508 compares $NVZ_i$ to a second threshold THRESHOLD2, where THRESHOLD2<THRESHOLD1.

If $NVZ_i$<THRESHOLD2 then a step 510 determines the value of a relief rate, referred to as $RR_i$, for the station according to the following equation:

$$RR_i = AWT_i \times (NVS_i + 1)$$

Station i is added to a list of stations to be supplied during a step 512, as this means that there are not enough vehicles in the zone.

If during step 508, $NVZ_i$>THRESHOLD2, then station i is excluded from the rest of the method during a step 514. The zone is considered to have an average supply of vehicles and therefore not need rebalancing.

Figure 6:
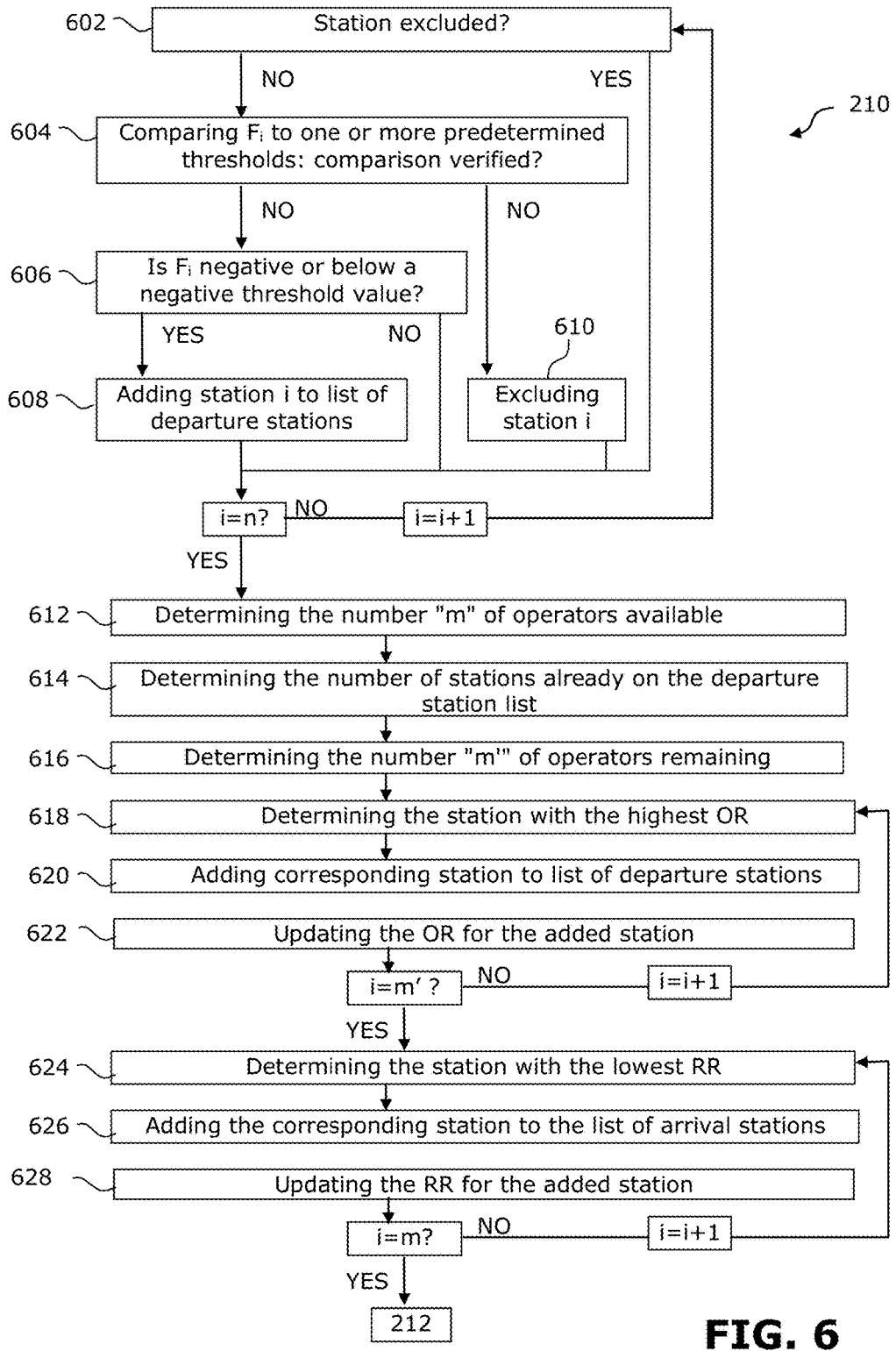

FIG. 6 is a diagrammatic representation in the form of a diagram of the step 210 of selecting the departure stations and arrival stations.

This step 210 comprises a step 602 of testing, for each of the n stations in the facility, whether that station has been excluded from the rest of the procedure, for example during step 514.

If the station is excluded, then the next station is tested.

If the station is not excluded, a step 604 compares the flow $F_i$ calculated for this station to one or more predetermined thresholds. For example, the flow can be compared to two predetermined thresholds to find out whether the flow $F_i$ is around the value of zero.

If the comparison is not verified, a step 606 determines whether the flow is below a negative threshold value.

If this is the case, then a step 608 adds this station to a list of departure stations. This means that many more vehicles arrive at the station than leave again, and vehicles should therefore be removed from the station. If not, the next station is tested.

If during step 604, the comparison is verified, this means that the flow is around zero or positive. In this case, the station is excluded from the rest of the procedure during a step 610. This means that the return time and the waiting time are equivalent, and the station is therefore self-regulating and does not need rebalancing. The next station is tested.

When all of the stations i have been tested, a step 612 is carried out to determine the number "m" of available operators.

A step 614 determines the number of stations already included on the list of departure stations, for example during step 608. As a function of this number and the number m of available operators, a number "m'" of operators remaining is determined during a step 616.

During a step 618, the list of stations to be relieved, made during step 506, is tested to determine the station with the highest occupancy rate OR.

During a step 620, the corresponding station is added to the list of departure stations.

The occupancy rate associated with the added station is updated as if a vehicle had been removed from it, during a step 622.

Then steps 618-622 are iterated until there are as many departure stations as free operators, or until there are no more stations on the list of stations to be relieved before the number "m'" of operators remaining is reached.

Then, during a step 624, the list of stations to be supplied, made during step 512, is tested to determine the station with the lowest relief rate RR.

During a step 626, the corresponding station is added to a list of arrival stations.

The relief rate associated with the station added to the list of arrival stations is updated as if a vehicle had been added to it, during a step 628.

Then steps 624-628 are iterated until there are as many arrival stations as free operators, or until there are no more stations on the list of stations to be supplied if the number of available operators is greater than the number of balancing operations.

Figure 7:
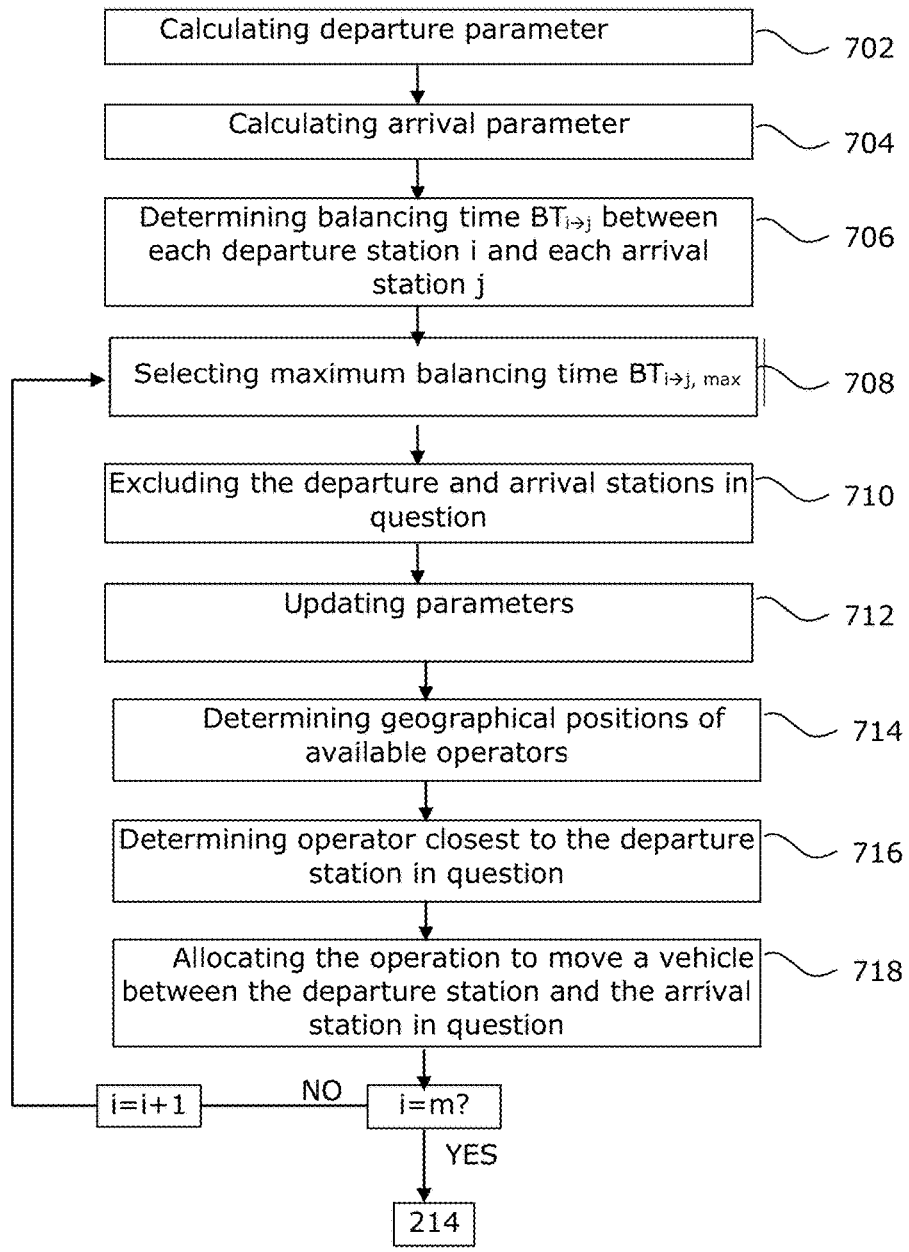

FIG. 7 is a diagrammatic representation in the form of a diagram of the step 212 of selecting the vehicle movements and the operators to carry out these movements.

Step 212 comprises a step 702 of calculating a departure parameter for each of the stations on the list of departure stations. The departure parameter is calculated according to the following equation:

$$DP_i = \frac{1}{\left(\frac{1}{AWT_i \times NVS_i}\right) + p \times \left(\sum \frac{V_k}{AWT_k \times NVZ_k}\right)}$$

where:
p is the probability of return to at least one closest station,
k is the number of stations in the zone associated with station i,
$NVZ_k$ is the number of vehicles in the zone associated with station k, and
$V_k$=1 if station k is empty and $V_k$=0 if not.

Then a step 704 determines an arrival parameter for each of the stations on the list of arrival stations. The arrival parameter is calculated according to the following equation:

$$AP_i = \frac{1}{\left(\frac{1}{AWT_i \times (NVS_i + 1)}\right) + p \times \left(\sum \frac{V_k}{AWT_k \times (NVZ_k + 1)}\right)}$$

where:
is the probability of return to at least one closest station,
k is the number of stations in the zone associated with station i,
$NVZ_k$ is the number of vehicles in the zone associated with station k, and
$V_k$=1 if station k is empty and $V_k$=0 if not.

It will be noted that the stations on the departure list could be determined using these parameters. However, this would require more powerful calculation means.

During a step 706, the balancing times $BT_{i \to j}$ between each departure station i on the list of departure stations (made during steps 608 and 620) and each arrival station j on the list of arrival stations (made during step 628) are calculated according to the following equation $$BT_{i \to j} = DP_i - (JT_{i \to j} \times AP_j)$$

where:
$DP_i$ is the departure parameter of departure station i,
$AP_j$ is the arrival parameter of station j, and
$JT_{i \to j}$ is the journey time from station i to station j.

During step 708, the maximum balancing time $BT_{i \to j, max}$ is selected from all of the balancing times calculated. This corresponds to the best balance.

During a step 710, the departure station and the arrival station with which the maximum balancing time $BT_{i \to j, max}$ is associated are respectively excluded from the list of departure stations and the list of arrival stations.

During a step 712, the various parameters, in particular the number of vehicles at the departure and arrival stations, are updated for the remaining stations on the lists of departure and arrival stations, as if a balancing operation had been carried out between the stations selected during step 710.

It will be noted that it is therefore possible for the same station to appear several times on the list of departure or arrival stations.

Step 714 determines the geographical positions of each of the m available operators.

During a step 716, the operator closest to the departure station selected during step 710 is determined.

A step 718 sends a message allocating the operation to move a vehicle from the departure station in question to the arrival station in question to the closest operator.

Steps 708 to 718 are iterated until all of the operators are allocated to a vehicle movement operation or there are no more departure stations or arrival stations on the lists of departure stations and arrival stations, if the number of available operators is greater than the number of balancing operations.

Of course, the invention is not limited to the examples that have just been described.

For example, the following modifications can be made:
the vehicles used are not necessarily electric vehicles and are therefore not necessarily connected to a charging terminal,
the departure and arrival parameters or selection from the list of stations to be relieved or supplied are not necessarily determined as a function of the neighbouring stations of the station,
some of the criteria described above can be optional: for example, the flow parameter could easily not be taken into account,
the time slots can also be chosen differently (with the slots not necessarily being rolling),
the various thresholds used, in particular for the number of vehicles, can be fixed or variable depending on the zone and the maximum capacity envisaged for the stations. They can also be expressed as absolute or relative values,
the waiting and return times can also be different from those chosen, provided that these parameters are chosen consistently.

The invention claimed is:

1. A method for rebalancing stations for collecting/returning vehicles made available for shared use, said method comprising a server with modules and database for executing the following steps:
for each station, detecting each vehicle departure from and arrival at said station and storing the data relating to said station in association with an item of time data;
for each station, determining:
a number of vehicles available at said station,
a waiting time of each vehicle at said station, and
determining and storing an average waiting time for each station as a function of the data stored in association with a given time slot;
filtering the stations as a function of the number of vehicles available at the station and the average waiting time, said filtering providing:
a first list, said departure station list, and
a second list, said arrival station list,
designing at least one vehicle movement operation between a station on the first list and a station on the second list; said movement operation including a step of selecting an operator to carry out a vehicle movement, said selection comprising the following steps:
determining the geographical position of each available operator;
as a function of said geographical position, determining the operator closest to the departure station involved in said movement;
sending a message to said closest operator to inform him of the task to be carried out;
updating the status of the operator to unavailable; and
carrying out at least one vehicle movement operation by moving vehicles.

2. The method according to claim 1, characterized in that the waiting time corresponds to a period between a return of a vehicle to said station and a collection of a vehicle from said station subsequent to said return.

3. The method according to claim 2, characterized in that at least one of the filtering or design steps is carried out by taking into account, for each station, at least one item of data relating to at least one neighbouring station of said station, the data or one of the items of data being a number of vehicles in a set, said zone, comprising said station and the stations closest to it.

4. The method according to claim 1, characterized in that a zone is defined as comprising:
all of the stations located at a distance and/or predetermined journey time as a function of the station in relation to which it is determined; or
a predetermined number of stations closest to the station in relation to which it is determined.

5. The method according to claim 1, characterized in that the filtering comprises the following steps carried out for at least one, preferably each, station:
comparing the total number of vehicles at the station or in the zone associated with said station to a first threshold;
when said total number is above said first threshold, adding said station to a list, said list of stations to be relieved;
comparing said total number to a second threshold, lower than said first threshold; and
when said total number is below said second threshold, adding said station to a list, said list of stations to be supplied.

6. The method according to claim 1, characterized in that it comprises a determination, for at least one station, in particular each station on the list of stations to be relieved, of a parameter, said occupancy rate, as a function of:
the number of vehicles available at the station; and
the average waiting time for a given time slot at said station;
the filtering step being carried out taking into account the value of said occupancy rate.

7. The method according to claim 6, characterized in that the filtering step comprises a step of selecting departure stations, in particular from the list of stations to be relieved as a function of the occupancy rate, said selection step comprising the following steps:
determining a number of operators available for moving a vehicle;
for each operator available, by successive iterations:
determining the station, in particular on the list of stations to be relieved, with the highest associated occupancy rate;
adding said station to the list of departure stations; and
updating the occupancy rate associated with said selected station by subtracting one vehicle from the number of vehicles available at said station.

8. The method according to claim 1, characterized in that it also comprises the determination of a parameter, flow, as a function of the average waiting time and an average time, return time, corresponding to the average time between the collection of a vehicle and the subsequent return of a vehicle to the station, the flow corresponding in particular to the inverse of the average waiting time minus the inverse of the average return time, the filtering step comprising the selection of at least one departure station as a function of said flow, said selection comprising at least one iteration of the following steps:
  comparing the flow associated with a station to a first threshold, in particular negative; and
  when said flow is below said first threshold, adding said station to the list of departure stations.

9. The method according to claim 7, characterized in that the selection step as a function of the flow is, if applicable, carried out before the step of determining the number of available operators, the number of available operators taking into account the number of stations at which the flow is below said threshold.

10. The method according to claim 1, characterized in that it also comprises the determination of a parameter, flow, as a function of the average waiting time and an average time, return time, corresponding to the average time between the collection of a vehicle and the subsequent return of a vehicle to the station, the flow corresponding in particular to the inverse of the average waiting time minus the inverse of the average return time, the filtering step comprising at least one iteration of the following steps:
  comparing said flow with a value range, in particular a range of values around 0; and
  when said flow is within the value range, excluding said station from the list of stations to be relieved or supplied.

11. The method according to claim 1, characterized in that it comprises the determination, for at least one station, in particular each station on the list of stations to be supplied, of a parameter, relief rate, as a function of:
  the number of vehicles available at the station; and
  the average waiting time for a given time slot at said station;
the filtering step being carried out taking into account the value of said relief rate.

12. The method according to claim 11, characterized in that the filtering step comprises a step of selecting arrival stations, in particular from the list of stations to be supplied, as a function of the relief rate, said selection step comprising the following steps:
  determining a number of operators available for moving a vehicle;
  for each available operator, by successive iterations:
    determining the station, in particular on the list of stations to be supplied, with the lowest associated relief rate;
    adding said station to the list of arrival stations; and
    updating the relief rate associated with said selected station by adding one vehicle to the number of vehicles available at said station.

13. The method according to claim 6, characterized in that the design step comprises a step of determining a balancing time, carried out before the movement step, comprising the following operations, carried out by successive iterations:
  for each station on the list of departure stations, determining a departure parameter, as a function at least of the occupancy rate;
  for each station on the list of arrival stations, determining a an arrival parameter, as a function at least of the relief rate;
  calculating the balancing time between each of the stations on the departure station list and each of the stations on the arrival station list, as a function of said departure and arrival parameters and a journey time between said departure and arrival stations; and
  selecting the movements as a function of the balancing times respectively calculated.

14. The method according to claim 13, characterized in that:
  the departure parameter is also calculated as a function of a probability of transfer to at least one closer station, in particular to all of the stations in the zone associated with said station; and/or
  the arrival parameter is also calculated as a function of a probability of transfer to at least one closer station, in particular to all of the stations in the zone associated with said station.

15. The method according to claim 13, characterized in that the design step takes into account the balancing time by at least one iteration of the following steps:
  determining the maximum balancing time from the balancing times calculated;
  determining the departure and arrival stations with which said maximum balancing time is associated and selecting these stations;
  excluding the stations from the departure and arrival lists;
  updating the number of vehicles at the departure and arrival stations as if the movement had already taken place.

16. The method according to claim 1, characterized in that the time slot is a rolling time slot, the range of which is predetermined and calculated as a function of the current time.

17. The method according to claim 1, characterized in that the waiting times stored are associated with at least one criterion such as the type of day, with only the waiting times associated with this criterion being used to calculate the average waiting time.

18. A system for rebalancing stations for collecting/returning vehicles made available for shared use, said system comprising:
  means for detecting each departure and each arrival of a vehicle at the station;
  means for determining, for each station, the following parameters:
    a number of vehicles available,
    a waiting time of each vehicle at the station,
  means for storing data relating to the waiting time in association with an item of time data;
  means for determining an average waiting time as a function of the data stored in association with a given time slot;
  means for storing the average waiting time determined;
  means for filtering the stations to be balanced as a function of said parameters, said filtering providing:
    a first list, said departure station list, and
    a second list, said arrival station list, and
  means for designing at least one vehicle movement operation between a station on the first list and a station on the second list; said movement operation including a step of selecting an operator to carry out a vehicle movement, said selection comprising the following steps:
    determining the geographical position of each available operator;
    as a function of said geographical position, determining the operator closest to the departure station involved in said movement;
    sending a message to said closest operator to inform him of the task to be carried out;

updating the status of the operator to unavailable; and
means for carrying out said at least one vehicle movement operation by moving vehicles.

19. A facility for the shared use of vehicles, said facility comprising:
a plurality of vehicle collection/return stations; and
means for implementing the steps of the rebalancing method according to claim 1, or a rebalancing system according to claim 18.

\* \* \* \* \*